(12) United States Patent
Sanders

(10) Patent No.: US 9,986,719 B1
(45) Date of Patent: Jun. 5, 2018

(54) PET DOOR WITH GROOMER AND VACUUM

(71) Applicant: Lamonte Ravelle Sanders, Banning, CA (US)

(72) Inventor: Lamonte Ravelle Sanders, Banning, CA (US)

( * ) Notice: Subject to any disclaimer, the term of this patent is extended or adjusted under 35 U.S.C. 154(b) by 160 days.

(21) Appl. No.: 15/233,278

(22) Filed: Aug. 10, 2016

Related U.S. Application Data

(60) Provisional application No. 62/203,145, filed on Aug. 10, 2015.

(51) Int. Cl.
*A01K 13/00* (2006.01)

(52) U.S. Cl.
CPC .......... *A01K 13/004* (2013.01); *A01K 13/002* (2013.01)

(58) Field of Classification Search
CPC .... A01K 13/004; A01K 13/00; A01K 13/003; A01K 1/035; A01K 13/002; E06B 7/32; E06B 7/28
See application file for complete search history.

(56) References Cited

U.S. PATENT DOCUMENTS

| 5,458,088 | A  | * | 10/1995 | Owens | A01K 1/035 |
| | | | | | 119/622 |
| 7,011,046 | B1 | * | 3/2006 | Kidwell | A01K 1/0047 |
| | | | | | 119/657 |
| 2007/0245975 | A1 | * | 10/2007 | Udelle | A01K 13/002 |
| | | | | | 119/600 |
| 2012/0222627 | A1 | | 9/2012 | Chura | |

* cited by examiner

*Primary Examiner* — Kristen C Hayes
(74) *Attorney, Agent, or Firm* — RG Patent Consulting, LLC; Rachel Gilboy

(57) ABSTRACT

A pet door with groomer and vacuum is a pet door with a swinging, flexible door but the framework around the door has an interior vacuum channel that connects an attachable vacuum with orifices located on the inner periphery of the framework. Bristles attached to the inner periphery act as a grooming brush to brush the hair of a pet passing through and to help remove any loose foreign material and hair clinging to the hair of the pet. The attached vacuum suctions up any loose material and collects it in a trap that is removable for emptying.

18 Claims, 4 Drawing Sheets

PET DOOR WITH GROOMER AND VACUUM

CROSS-REFERENCE TO RELATED APPLICATION

The present application is related to and claims priority from prior provisional application Ser. No. 62/203,145, filed Aug. 10, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of pet doors and more specifically relates to pet door with groomer and vacuum.

2. Description of the Related Art

Pet doors that provide access for a pet to enter and go out of a residence have become popular in recent years and provide many advantages for the pet owner. An owner of a pet no longer has to be sensitive to a pet's subtle indications that it needs to go out to urinate or defecate, or to just go out and enjoy the outdoors, because the pet will use the door at will. This frees up a considerable amount of time for the owner. One problem with this though is that the pet often brings in unwanted debris from the outside. Pets enjoy rolling on the ground and loose material such as leaves, grass, and dirt tend to cling to the hair of the pet. This inadvertently gets left in the house along with the pet's loose hair. With the advantages of not having to attend the pet frequently, comes the disadvantage of added time for clean up. There should be a solution for this problem.

Various attempts have been made to solve the above-mentioned problems such as those found in U.S. Pat. No. 7,011,046 to Jack Randall Kidwell; U.S. Pat. No. 5,458,088 to James L. Owens; and U.S. Pat. No. 2012/0222627 to Mike Chura. None of the above inventions and patents, taken either singly or in combination, is seen to describe the invention as claimed.

Ideally, a pet door should provide easy pet access and greatly reduce loose pet hair and debris from entering the home, and yet, would operate reliably and be manufactured at a modest expense. Thus, a need exists for a reliable pet door with groomer and vacuum to avoid the above-mentioned problems.

BRIEF SUMMARY OF THE INVENTION

In view of the foregoing disadvantages inherent in the known pet doors art, the present invention provides a novel pet door with groomer and vacuum. The general purpose of the present invention, which will be described subsequently in greater detail, is to provide easy pet access and greatly reduce loose pet hair and debris from entering the home.

The pet door with groomer and vacuum preferably comprises a frame assembly having a top side, a left side, a right side, and a bottom side attached end to end to form a rectangular door frame, a motorized vacuum, a battery compartment, and a flexible swinging door. The top side, the left side, the right side, and the bottom side each contain an inner vacuum channel that when the four sides are attached together, a single inner volume is formed for air to pass through. The inner periphery of the top side, the left side, the right side, and the bottom side each are adapted to have a plurality of vacuum holes or nozzles that are formed and connected with the single inner volume, and the vacuum holes are spaced apart along the inner periphery of at least three sides, and preferably four sides.

The motorized vacuum is in communication with the inner volume and is adapted to draw a vacuum therethrough. The battery compartment is in communication with the motorized vacuum and is adapted to provide an operating power thereto when at least one battery is located within the compartment. The flexible swinging door is hinged, on the upper side, to the inner periphery of the top side such that the flexible swinging door is adapted to open when pressed against and to close after a pet passes therethrough. The frame assembly further has a plurality of grooming bristles that are adapted to function as a brush to groom the pet as it passes through the door. The grooming bristles are attached and dispersed evenly about the vacuum holes and are angled inward toward the center of the rectangle formed by the frame assembly. The frame assembly preferably has a rubber seal and weather stripping to seal the frame assembly against precipitation entering around or through the door. The frame assembly may be constructed of molded plastic but in some embodiments may have a metal frame which could be aluminum or a ferrous metal that is sealed against the door with a rubber seal or weather stripping. The flexible swinging door has a magnet located on a bottom end and the bottom side of the frame assembly includes a aligning magnet for holding the flexible swinging door closed. In an embodiment where the frame assembly is made of ferrous metal, the magnet in the swinging door will be attracted to the bottom side of the frame assembly. A magnet is located at the closest point to contact in the embodiments not having ferrous metal.

The frame assembly preferably includes an infrared beam emitter and beam detector that is adapted to activate the vacuum when the infrared beam between the infrared beam emitter and the beam detector are interrupted because of a pet passing through the rectangular door frame. As the pet passes through, the brush and motorized vacuum groom the pet and vacuum loose hair and other debris clinging to the hair of the pet to reduce the amount of cleaning necessary inside the house. The motorized vacuum may be direct current operated but may, in some embodiments, be alternating current. In these embodiments, a circuit may be ran inside the door to the motorized vacuum and have a rectangular recess in both sides of the door jamb for extra wiring slack for flexibility. This type of arrangement may be preferable in locations where very high pet traffic and frequent replacement of the battery(s) is a factor.

The motorized vacuum is removable from and attachable to the frame assembly via fasteners and seals against the frame assembly and inner volume of the vacuum channel The motorized vacuum further includes a removable debris trap which slides into a trap housing located either in the frame assembly or the vacuum housing so that it can be easily removed and emptied as needed. The removable debris trap may located on the underside of the bottom side of the frame assembly if located in the frame. The removable debris trap may slide upwardly to be removed from the trap housing. The pet door with groomer and vacuum is very useful for allowing a pet to ingress and egress a residence at will and to groom and to vacuum loose hair from the pet during every use to reduce the amount of loose pet hair and debris such as leaves, grass, dirt such commonly will cling to the pet's hair when it rolls on the ground as pets like to do.

The pet door with groomer and vacuum may be offered as a kit that includes at least one frame assembly having a top side, a left side, a right side, and a bottom side, at least one motorized vacuum that is attachable to the frame assembly, at least one set of fasteners, at least one debris trap, and at least one set of installation instructions.

The present invention holds significant improvements and serves as a pet door with groomer and vacuum. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pet door with groomer and vacuum, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a pet door and more particularly to a pet door with groomer and vacuum as used to improve the cleanliness inside the home while retaining the freedom of entering and exiting for pets.

Generally speaking, the pet door with groomer and vacuum is a pet door with a swinging, flexible door but the framework around the door has an interior vacuum channel that connects an attachable vacuum with orifices located on the inner periphery of the framework. Bristles attached to the inner periphery act as a grooming brush to brush the hair of a pet passing through and to help remove any loose foreign material and hair clinging to the hair of the pet. The attached vacuum suctions up any loose material and collects it in a trap that is removable for emptying.

Figure 1:
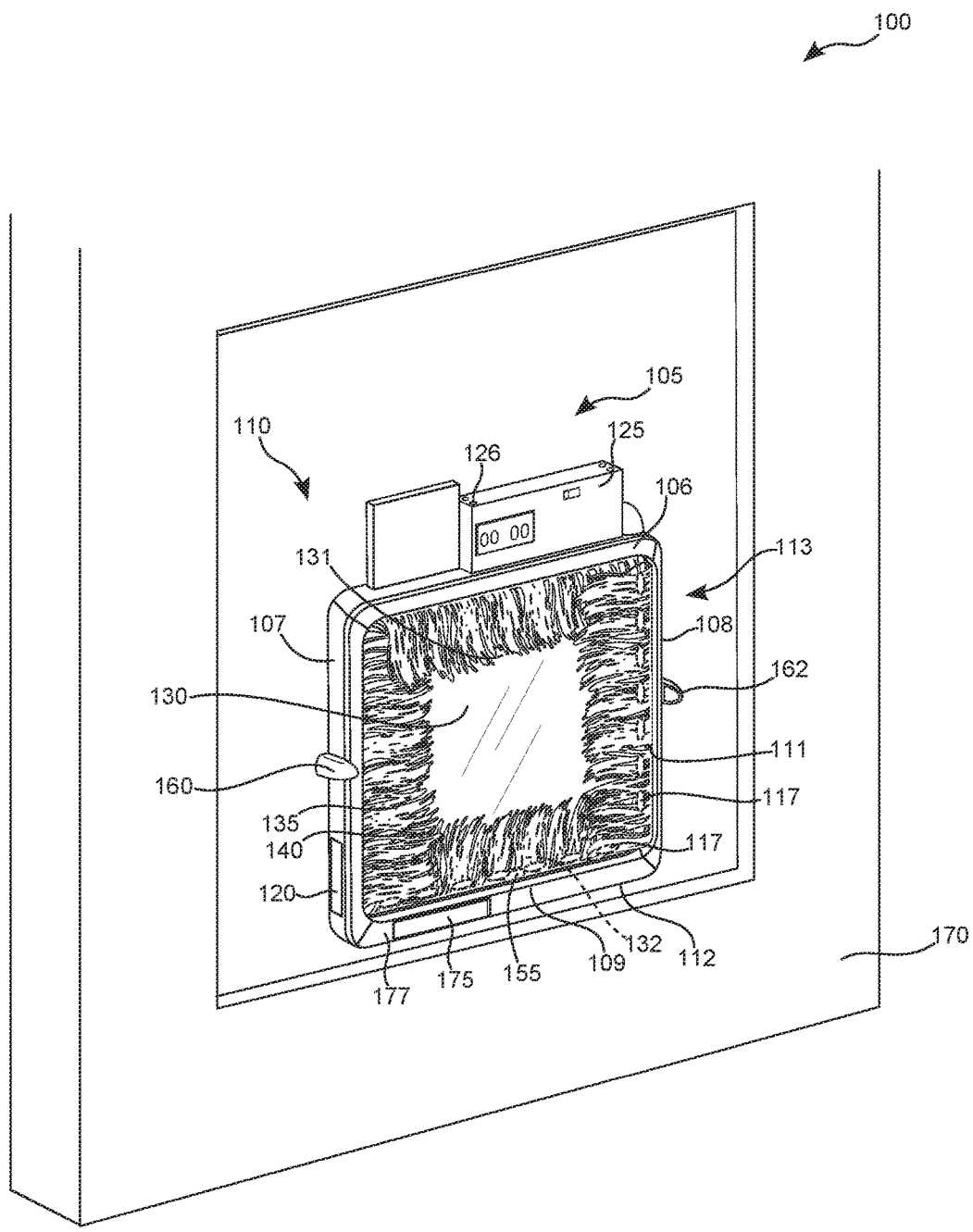
FIG. 1 shows a perspective view illustrating a pet door with groomer and vacuum according to an embodiment of the present invention.

Referring to the drawings by numerals of reference there is shown in FIG. 1, shows a perspective view illustrating pet door with groomer and vacuum 100 according to an embodiment of the present invention.

Pet door with groomer and vacuum 100 is very useful for allowing a pet to ingress and egress a residence at will and to groom and to vacuum loose hair from the pet during every use to reduce the amount of loose pet hair and debris such as leaves, grass, dirt such commonly will cling to the pet's hair when it rolls on the ground as pets like to do. Pet door with groomer and vacuum 100 is designed to allow complete access to pets to ingress and egress a home at will but has the added advantage of grooming and vacuuming loose hair and matter clinging to the hair of the pet. This greatly reduces the cleaning that is ordinarily necessary with owning a pet. Motorized vacuum 125 attaches to frame assembly 105 and frame assembly 105 has inner vacuum channel 115 that, when left side 107 and right side 108, top side 106 and bottom side 109 are joined end to end form single inner volume 116 and inner vacuum channel 115 that is in communication with motorized vacuum 125. The vacuum holes 117 of inner vacuum channel 115 are located around inner periphery 111 of frame assembly 105, that which comes closest to the pet as it passes through rectangular door frame 110. Grooming bristles 135, acting like brush 140, comb the fur of the pet and dislodge loose foreign material clinging to the pet. Further in-depth description of the aspects of the invention is detailed in the following figures.

Figure 2:
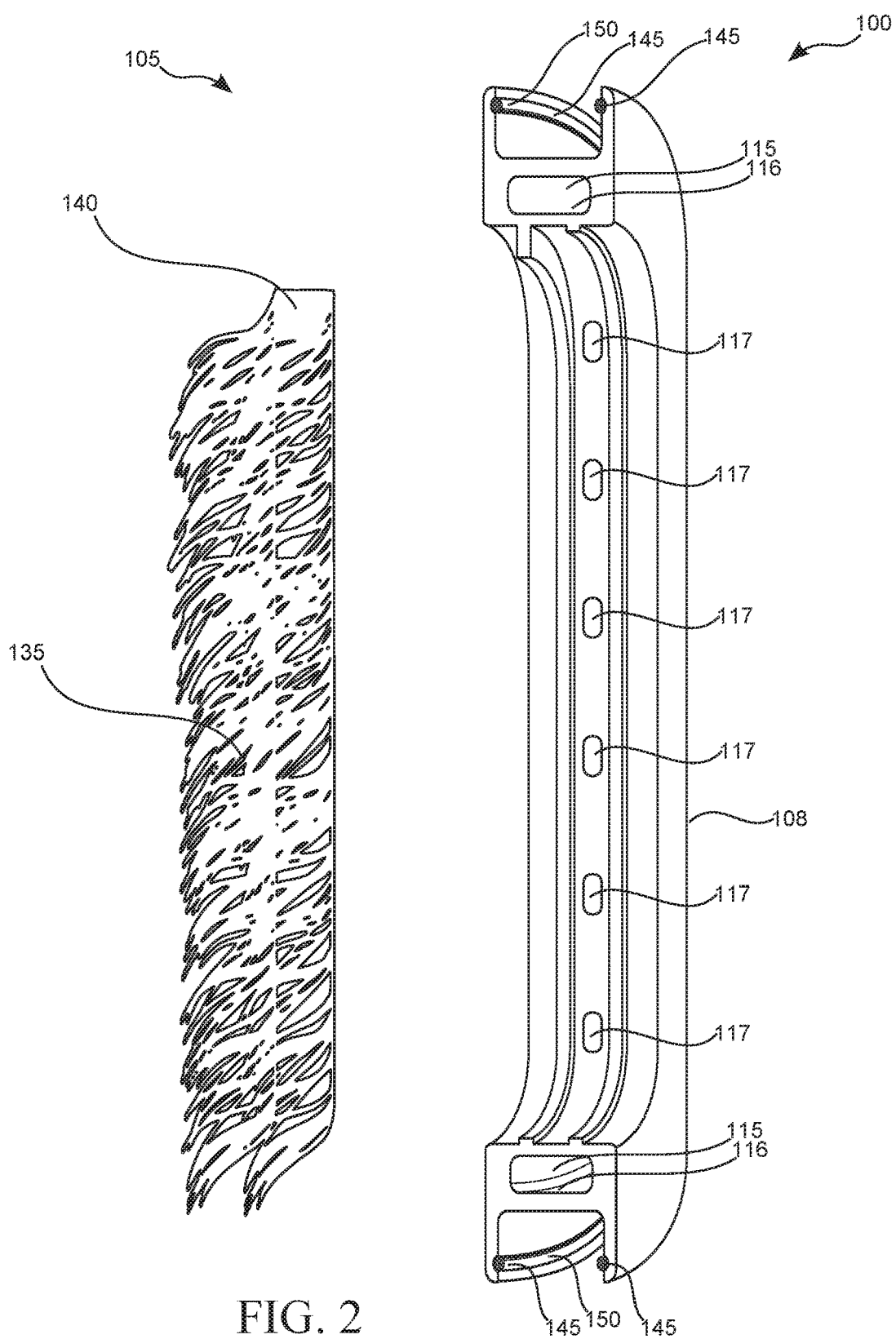
FIG. 2 is a cutaway view illustrating a side of the frame assembly of the pet door with groomer and vacuum according to an embodiment of the present invention of FIG. 1.

Referring now to FIG. 2, is a cutaway view illustrating a side 113 of frame assembly 105 of pet door with groomer and vacuum 100 according to an embodiment of the present invention of FIG. 1.

Pet door with groomer and vacuum 100 preferably comprises frame assembly 105 having top side 106, left side 107, right side 108, and bottom side 109 attached end to end to form rectangular door frame 110, motorized vacuum 125, battery compartment 120, and flexible swinging door 130. Top side 106, left side 107, right side 108, and bottom side 109 each contain inner vacuum channel 115 that when top side 106, left side 107, right side 108, and bottom side 109 are attached together, single inner volume 116 is formed for air to pass through. Inner periphery 111 of top side 106, left side 107, right side 108, and bottom side 109 each are adapted to have a plurality of vacuum holes 117 or nozzles that are formed and connected with single inner volume 116, and vacuum holes 117 are spaced apart along inner periphery 111 of at least three sides 113, and preferably four sides 113.

Flexible swinging door 130 is hinged, on upper side 131, to inner periphery 111 of top side 106 such that flexible swinging door 130 is adapted to open when pressed against and to close after a pet passes therethrough. Frame assembly 105 further has a plurality of grooming bristles 135 that are adapted to function as brush 140 to groom the pet as it passes through pet door with groomer and vacuum 100. Grooming bristles 135 are attached and dispersed evenly about vacuum holes 117 and are angled inward toward the center of rectangular door frame 110 formed by frame assembly 105. Frame assembly 105 preferably has rubber seal 145 and weather strip 150 to seal frame assembly 105 against precipitation entering around or through pet door with groomer and vacuum 100. Frame assembly 105 may be constructed of molded plastic but in some embodiments may have a metal frame assembly 105 which could be aluminum or a ferrous metal that is sealed against frame assembly 105 with rubber seal 145 or weather strip 150. Flexible swinging door 130 has magnet 155 located on bottom end 132 and bottom side 109 of frame assembly 105 includes an aligning magnet 155 for holding flexible swinging door 130 closed. In an embodiment where frame assembly 105 is made of ferrous metal, magnet 155 in flexible swinging door 130 will be attracted to bottom side 109 of frame assembly 105. Magnet 155 is located at the closest point to contact in the embodiments not having ferrous metal.

Figure 3:
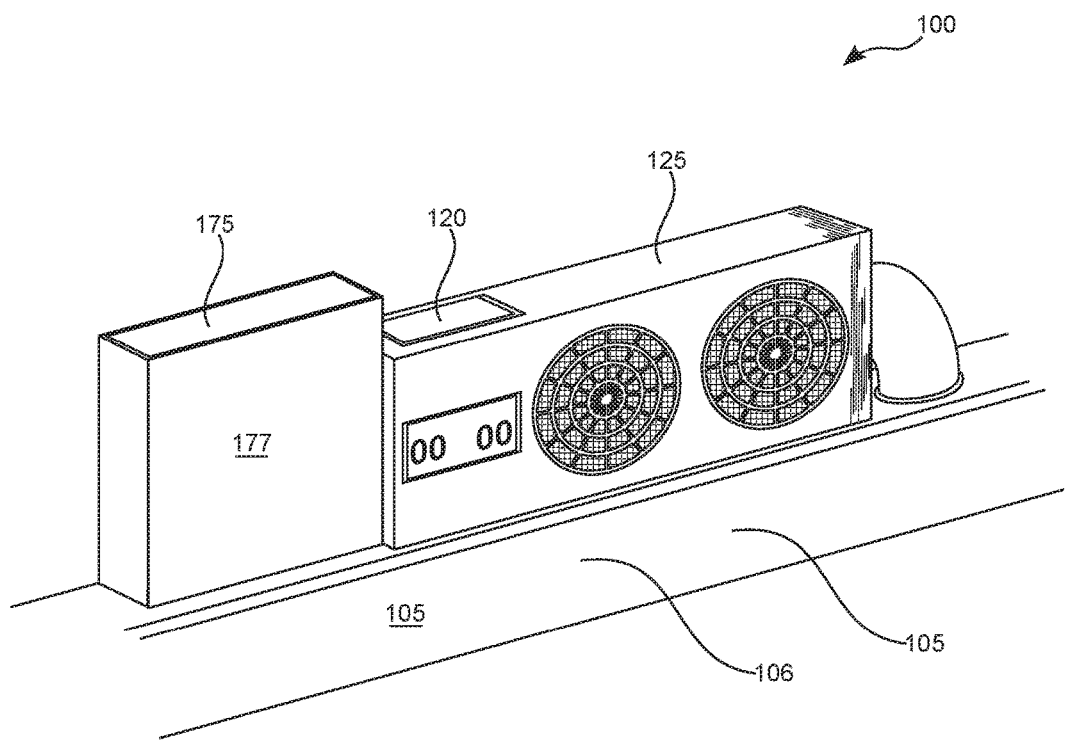
FIG. 3 is a perspective view illustrating a vacuum of the pet door with groomer and vacuum according to an embodiment of the present invention of FIG. 1.

Referring now to FIG. 3, is a perspective view illustrating motorized vacuum 125 of pet door with groomer and vacuum 100 according to an embodiment of the present invention of FIG. 1.

Motorized vacuum 125 is removable from and attachable to frame assembly 105 via fasteners 180 and seals against frame assembly 105 and single inner volume 116 of inner vacuum channel 115. Motorized vacuum 125 is in communication with inner vacuum channel 115 and is adapted to draw a vacuum therethrough. Battery compartment 120 is in communication with motorized vacuum 125 and is adapted to provide an operating power thereto when at least one battery is located within battery compartment 120. Frame assembly 105 preferably includes infrared beam emitter 160 and beam detector 162 that is adapted to activate motorized vacuum 125 when the infrared beam between infrared beam emitter 160 and beam detector 162 are interrupted because of a pet passing through rectangular door frame 110.

As the pet passes through, brush 140 and motorized vacuum 125 groom the pet and vacuum loose hair and other debris clinging to the hair of the pet to reduce the amount of cleaning necessary inside the house. Motorized vacuum 125 may be direct current operated but may, in some embodiments, be alternating current. In these embodiments, a circuit may be ran inside door 170 to motorized vacuum 125 and have a rectangular recess in both sides of door 170 jamb for extra wiring slack for flexibility. This type of arrangement may be preferable in locations where very high pet traffic and frequent replacement of the battery(s) is a factor.

Figure 4:
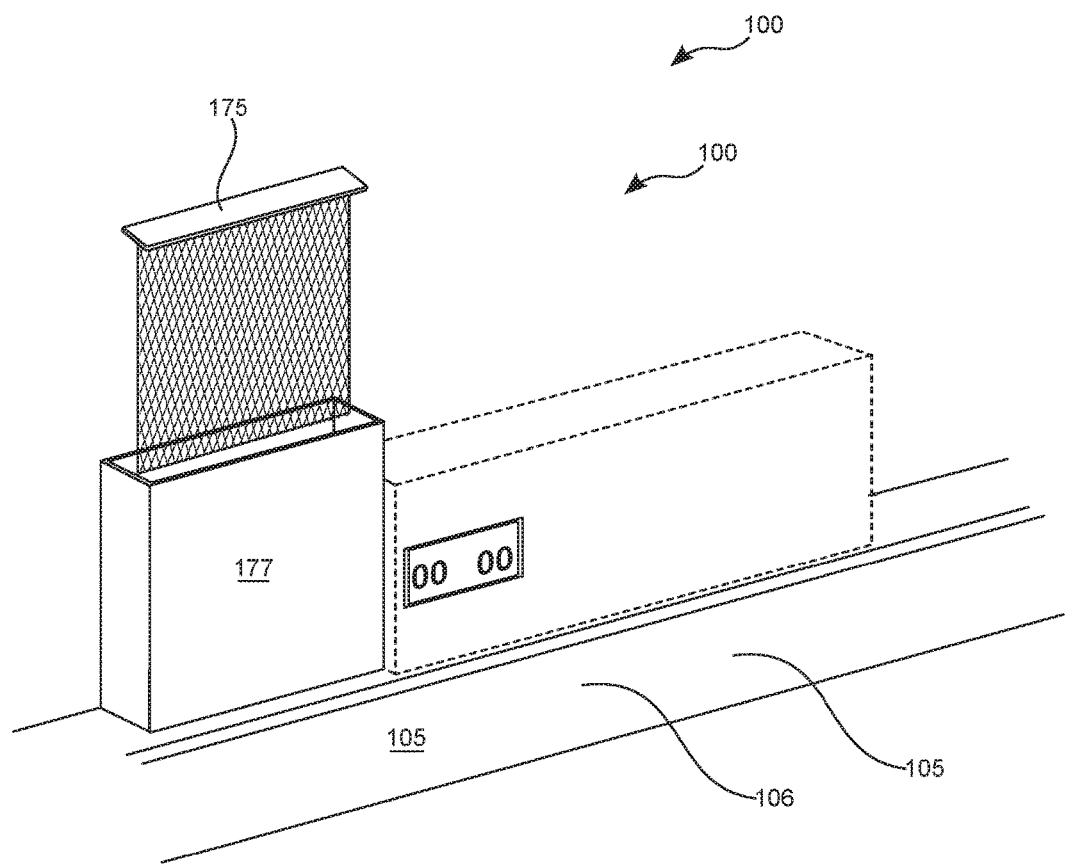
FIG. 4 is a perspective view illustrating a debris trap of the pet door with groomer and vacuum according to an embodiment of the present invention of FIG. 1.

Referring now to FIG. 4, is a perspective view illustrating debris trap 175 of pet door with groomer and vacuum 100 according to an embodiment of the present invention of FIG. 1.

Motorized vacuum 125 further includes a removable debris trap 175 which slides into trap housing 177 located either in frame assembly 105 or the housing of motorized vacuum 125 so that it can be easily removed and emptied as needed. The removable debris trap 175 may located on underside 112 of bottom side 109 of frame assembly 105 if debris trap 175 located in frame assembly 105 but in other embodiments, may be located in either of left side 107, right side 108 or top side 106. The removable debris trap 175 may slide upwardly to be removed from trap housing 177 depending on which embodiment it is, but can slide sideways or tilt outwards. In yet another embodiment, debris trap 175 may have a cup that is removable from motorized vacuum 125.

Pet door with groomer and vacuum 100 may be sold as kit 450 comprising the following parts: at least one frame assembly having at least one top side, a left side, a right side, and a bottom side; at least one motorized vacuum; at least one set of fasteners; at least one debris trap; and at least one set of user instructions. The kit has instructions such that functional relationships are detailed in relation to the structure of the invention (such that the invention can be used, maintained, or the like in a preferred manner). Pet door with groomer and vacuum 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above- mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pet door with groomer and vacuum comprising:
   a frame assembly having a top side, a left side, a right side, and a bottom side attached end to end to form a rectangular door frame;
   wherein said top side, said left side, said right side, and said bottom side each contain an inner vacuum channel attached together to form a single inner volume and wherein an inner periphery of said top side, a left side, a right side, and a bottom side each are adapted to have a plurality of vacuum holes formed with said single inner volume and are spaced apart along said inner periphery;
   a battery compartment;
   wherein said battery compartment is located in said bottom side of said frame assembly and is in communication with said motorized vacuum, said battery compartment is adapted to provide an operating power to said motorized vacuum when at least one battery is located therein;
   a motorized vacuum;
   wherein said motorized vacuum is attached to said top side of said frame assembly and is in communication with said single inner volume, and wherein said motorized vacuum is adapted to draw a vacuum therethrough;
   a flexible swinging door;
   wherein said flexible swinging door is hinged on an upper side to said inner periphery of said top side such that said flexible swinging door is adapted to open when pressed against and to close after a pet passes therethrough; and wherein said pet door with groomer and vacuum is useful for allowing a pet to ingress and egress a residence at will and to groom and to vacuum a loose hair from said pet during every use.

2. The pet door with groomer and vacuum of claim 1 wherein said frame assembly further comprises a plurality of grooming bristles.

3. The pet door with groomer and vacuum of claim 2 wherein said plurality of grooming bristles are attached and dispersed evenly about said plurality of vacuum holes.

4. The pet door with groomer and vacuum of claim 2 wherein said plurality of grooming bristles are adapted to function as a brush.

5. The pet door with groomer and vacuum of claim 2 wherein said plurality of grooming bristles are angled inward toward a center of said rectangle formed by said frame assembly.

6. The pet door with groomer and vacuum of claim 1 wherein said frame assembly is adapted to have a rubber seal and weather strip to seal said pet door with groomer and vacuum against a precipitation from entering said door.

7. The pet door with groomer and vacuum of claim 1 wherein said flexible swinging door further includes a magnet located on a bottom end and said bottom side of said frame assembly includes an aligning magnet for holding said flexible swinging door closed.

8. The pet door with groomer and vacuum of claim 1 wherein said frame assembly further includes an infrared beam emitter and beam detector.

9. The pet door with groomer and vacuum of claim 1 wherein said infrared beam emitter and beam detector is adapted to activate said vacuum when an infrared beam between said infrared beam emitter and said beam detector are interrupted via a pet passing through said rectangular door frame.

10. The pet door with groomer and vacuum of claim 1 wherein said frame assembly is constructed of molded plastic.

11. The pet door with groomer and vacuum of claim 1 wherein said motorized vacuum is direct current operated.

12. The pet door with groomer and vacuum of claim 11 wherein said motorized vacuum further includes a removable debris trap and a trap housing.

13. The pet door with groomer and vacuum of claim 12 wherein said removable debris trap is located on an underside of said bottom side of said frame assembly.

14. The pet door with groomer and vacuum of claim 1 wherein said removable debris trap slides upward to be removed from said trap housing.

15. The pet door with groomer and vacuum of claim 12 wherein said motorized vacuum is removable from said frame assembly via fasteners.

16. The pet door with groomer and vacuum of claim 1 wherein said trap housing is integrally formed with said motorized vacuum housing.

17. A pet door with groomer and vacuum comprising:
a frame assembly having a top side, a left side, a right side, and a bottom side attached end to end to form a rectangular door frame;
wherein said top side, said left side, said right side, and said bottom side each contain an inner vacuum channel attached together to form a single inner volume and wherein an inner periphery of said top side, a left side, a right side, and a bottom side each are adapted to have a plurality of vacuum holes formed with said single inner volume and are spaced apart along an inner periphery;
a motorized vacuum;
wherein said motorized vacuum is in communication with said inner volume and is adapted to draw a vacuum therethrough;
a battery compartment;
wherein said battery compartment is in communication with said motorized vacuum and is adapted to provide an operating power thereto when at least one battery is located therein;
a flexible swinging door;
wherein said flexible swinging door is hinged on an upper side to said inner periphery of said top side such that said flexible swinging door is adapted to open when pressed against and to close after a pet passes therethrough; and
wherein said pet door with groomer and vacuum is useful for allowing a pet to ingress and egress a residence at will and to groom and to vacuum a loose hair from said pet during every use;
wherein said frame assembly further comprises a plurality of grooming bristles;
wherein said plurality of grooming bristles are attached and dispersed evenly about said plurality of vacuum holes;
wherein said plurality of grooming bristles are adapted to function as a brush;
wherein said plurality of grooming bristles are angled inward toward a center of said rectangle formed by said frame assembly;
wherein said frame assembly is adapted to have a rubber seal and weather strip to seal said pet door with groomer and vacuum against a precipitation from entering said door;
wherein said frame assembly is constructed of molded plastic;
wherein said flexible swinging door further includes a magnet located on a bottom end and said bottom side of said frame assembly includes an aligning magnet for holding said flexible swinging door closed;
wherein said frame assembly further includes an infrared beam emitter and detector;
wherein said infrared beam emitter and detector is adapted to activate said vacuum when an infrared beam between said infrared beam emitter and said detector are interrupted via a pet passing through said rectangular door frame;
wherein said motorized vacuum is direct current operated;
wherein said motorized vacuum is removable from said frame assembly via fasteners;
wherein said motorized vacuum further includes a removable debris trap and a trap housing;
wherein said removable debris trap is located on an underside of said bottom side of said frame assembly;
wherein said removable debris trap slides upward to be removed from said trap housing; and
wherein said trap housing is integrally formed with said motorized vacuum housing.

18. The pet door with groomer and vacuum of claim 17 further comprising a kit including:
At least one said frame assembly having said top side, said left side, said right side, and said bottom side;

at least one said motorized vacuum that is attachable to said frame assembly;
at least one set of fasteners;
at least one said debris trap; and
at least one set of installation instructions.

\* \* \* \* \*